United States Patent [19]

Köhler et al.

[11] Patent Number: 5,240,988
[45] Date of Patent: Aug. 31, 1993

[54] MIXTURES OF POLYARYLENE SULFIDES, CROSSLINKING AGENTS CONTAINING NITRO GROUPS AND GLASS FIBERS

[75] Inventors: Burkhard Köhler; Hans-Detlef Heinz, both of Krefeld, Fed. Rep. of Germany

[73] Assignee: Bayer Aktiengesellschaft, Leverkusen-Bayerwerk, Fed. Rep. of Germany

[21] Appl. No.: 602,779

[22] Filed: Oct. 24, 1990

[30] Foreign Application Priority Data

Nov. 14, 1989 [DE] Fed. Rep. of Germany ....... 3937754

[51] Int. Cl.$^5$ ............................................. C08L 81/00
[52] U.S. Cl. ..................... 524/609; 525/537
[58] Field of Search ..................... 525/537; 524/609

[56] References Cited

U.S. PATENT DOCUMENTS 4,440,915  4/1984  Asakura et al. ...................... 525/537
5,086,128  2/1992  Heinz et al. .......................... 525/537

FOREIGN PATENT DOCUMENTS 0345550 12/1989 European Pat. Off. ............ 525/537
0345551 12/1989 European Pat. Off. .
0381865  8/1990 European Pat. Off. .

OTHER PUBLICATIONS

Jp. Appl. No. 62-209785, 1987 (abstract only).

Primary Examiner—John C. Bleutge
Assistant Examiner—Mark D. Sweet
Attorney, Agent, or Firm—Connolly & Hutz

[57] ABSTRACT

The invention relates to mixtures of polyarylene sulfides, crosslinking agents containing nitro groups, and optionally, mineral fillers and to the moldings obtainable from these mixtures.

4 Claims, No Drawings

MIXTURES OF POLYARYLENE SULFIDES, CROSSLINKING AGENTS CONTAINING NITRO GROUPS AND GLASS FIBERS

This invention relates to mixtures of polyarylene sulfides, crosslinking agents containing nitro groups and, optionally, other additives. Moldings of these mixtures are distinguished by good mechanical properties.

Polyarylene sulfides (PAS) are known (cf. for example U.S. Pat. No. 3,354,129, EP 171 021). They are inert, high-temperature-resistant thermoplastics which can be filled to a high degree, for example with glass fibers or other inorganic fillers. These polymers, particularly polyphenylene sulfide (PPS), are being used to an increasing extent for applications hitherto reserved for thermosets.

PAS have inadequate mechanical properties for certain applications, for example in the injection-molding field. In particular, their flexural strength or tensile strength and their impact strength are often inadequate for practical requirements. Accordingly, it has proved to be of advantage to improve these properties of PAS, for example by blending with other thermoplastics, including polycarbonates (JA-A 51-69952, EP-A 104 543, U.S. Pat. No. 4,021,596).

However, the property spectrum of such mixtures is not always entirely satisfactory for certain applications.

In addition, it is known that maleic imides containing several maleic imide functions improve the properties of PAS under oxidative conditions (JP-A 202 162, EP-A 105 639). Owing to their polar character, however, maleic imide structures reduce the resistance of PAS to polar solvents, such as water or alcohols. PAS modifiers which contain few, if any, maleic imide structures, but which also have an improving effect on the mechanical properties would therefore be desirable.

The present invention is based on the observation that the reaction products of PAS, particular PPS, with small quantities of selected nitro compounds and, optionally, other additives, more especially with aminosilane-sized fillers or reinforcing materials, are distinguished by their toughness, flexural strength and outer fiber strain.

The present invention relates to mixtures of

A) 99.9 to 20% by weight and preferably 30 to 70% by weight polyarylene sulfide, preferably polyphenylene sulfide B) 0.1 to 10% by weight and preferably 0.2 to 2% by weight nitro compounds corresponding to formula I,

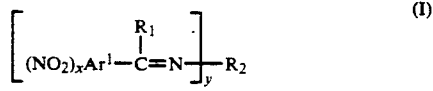

in which
Ar$^1$ is a di-, tri- or tetrafunctional aromatic C$_{6\text{-}14}$ radical,
R$^1$ is a hydrogen atom, a C$_{1\text{-}22}$ alkyl radical, a C$_{7\text{-}22}$ alkylaryl radical or a C$_{6\text{-}14}$ aryl radical, preferably a hydrogen atom,
R$^2$ is a di-, tri- or tetrafunctional aliphatic, cycloaliphatic, aromatic or aliphatic-aromatic radical, preferably an aromatic or aliphatic-aromatic radical, containing 3 to 100 and preferably 6 to 20 carbon atoms, which may even be arranged in rings; two or more aromatic rings may optionally be attached by a chemical bond, an alkylidene radical, an oxygen atom, a sulfur atom, a disulfide bridge, a carbonyl group, a sulfone group and/or a 5- to 6-membered heterocycle,
or if y is the number 2, represents a single bond,
x is the number 1, 2 or 3, preferably the number 1, and
y is the number 2, 3 or 4, preferably the number 2, and
C) 0 to 79.9% by weight and preferably 9.9 to 69.9% by weight mineral fillers and reinforcing materials which are preferably sized with trialkoxysilanes containing amino groups.

Polyarylene sulfides in the context of the invention are, for example, the commercially available, linear or branched polycondensates known per se (TEDUR ®, RYTON ®) obtainable by reaction of aromatic dihalogen compounds, more especially p-dichlorobenzene, with sulfur donors (for example sodium sulfide), cf. for example U.S. Pat. No. 3,354,129, EP-OS 171 021.

Examples of compounds of formula I according to the invention are the bisazomethines obtainable from 2-, 3- or 4-nitrobenzaldehyde with bis-(4-aminophenyl)-methane, 4,4'-diaminodiphenyl ether, benzidine, 2,2'-dimethyl- or 2,2'-dimethoxybenzidine, 4,4'-diaminodiphenyl sulfone, 4,4'-diaminodiphenyl sulfide, 4,4'-diaminodiphenyl disulfide, 4,4'-diaminobenzophenone, hexamethylene diamine or hydrazine.

The compounds corresponding to formula I are produced, for example, by reaction of the aldehyde with the amine in the presence of an azeotropic agent in accordance with Organikum, 11th Ed., VEB-Verlag, page 425.

Fillers and reinforcing materials according to the invention are preferably glass fibers sized with trialkoxysilanes containing amino groups, kaolins, talcums, micas or silica flours.

Commercially available glass beads (for example Ballotini glass beads) may even be used as mineral fillers instead of the glass fibers.

Other mineral fillers or additives according to the invention are, for example, metal oxides and sulfides (for example TiO$_2$, ZnO, ZnS), graphite, carbon black, fibers (for example of quartz, carbon), carbonates (for example MgCO$_3$, CaCO$_3$) or sulfates (for example CaSO$_4$, BaSO$_4$), metal powders, fibers, spangles or flakes.

Bismaleic imides of diamines, for example of methylene dianiline, m- or p-phenylenediamine, or of 4,4'-diaminodiphenyl sulfone may also be added to the mixtures according to the invention.

Other typical additives include pigments, mould releasing agents, E-waxes, flow aids, nucleating agents or stabilizers.

The mixtures according to the invention are produced with shearing at temperatures above the melting point of the PAS, preferably in kneaders or extruders. The mixtures according to the invention of polyarylene sulfides, crosslinking agents containing nitro groups and known commercially available fillers and reinforcing materials may be produced by compounding processes known per se in single-screw or multiple-screw extruders, preferably in degassing extruders, for example ZSK extruders, suitable kneaders, such as BUSS-KO kneaders, or agglomerators (for example Pallmann/Condux).

For compounding, single-screw extruders are preferred to twin-screw or multiple-screw extruders.

In addition, these mixtures may be prepared from the individual components either in dosed for or in admixture by any of the processes known from powder mixing technology.

Powder mixtures of the type in question may be prepared, for example, in cone screw mixers, tumble mixers, turbine mixers, Rhönrad or similar mixers.

The present invention also relates to the use of the mixtures according to the invention as molding compounds for the production of moldings, semifinished products, films and fibers.

The present invention also relates to the moldings obtained from the mixtures according to the invention.

The mixtures according to the invention may be processed in known manner to moldings, semifinished products, fibers, films, profiles, etc. They may generally be used with advantage for applications typically reserved for thermoplastic compounds.

EXAMPLES

The mixtures were produced in a Werner & Pfleiderer ZSK 32 twin-screw extruder at a temperature of 320° C.

The Polyphenylenesulfide (PPS) used had a melt viscosity of 30 Pa.s (as measured at 306° C. and at a shear rate of 1,000 1/s) and had been produced in accordance with EP-A 171 021.

CS 7916® glass fibers sized with trialkoxysilane containing amino groups were used in a quantity of 40% by weight as the glass fibers.

The mixtures were granulated and injected-molded to 80×10×4 mm test specimens which were used to determine flexural strength, outer fiber strain and impact strength $a_n$ (reversed notched), ISO 180).

COMPARISON EXAMPLE

60% by weight PPS was mixed with 40% by weight glass fibers.

The test specimens obtained from this mixture showed the following mechanical characteristics: flexural strength 240 MPa, outer fiber strain 1.8%, impact strength $a_n$ 28 kJ/m².

EXAMPLE 1

59% by weight PPS and 1% by weight of the bisazomethine of 4-nitrobenzaldehyde and bis-(4-aminophenyl)methane were mixed with 40% by weight glass fibers. The test specimens obtained from the resulting mixture showed the following mechanical characteristics: flexural strength 303 MPa, outer fiber strain 2.4%, impact strength $a_n$ 48 kJ/m².

EXAMPLE 2

59% by weight PPS and 1% by weight of a hydrazone obtained from 2 moles 3-nitrobenzaldehyde and 1 mole hydrazine.

The test specimens obtained from this mixtures showed the following mechanical characteristics: flexural strength 308 MPa, outer fiber strain 2.4%, impact strength 45 kJ/m².

We claim:

1. Mixtures of
A) reaction products of i) 99.9 to 20% by weight polyarylene sulfide, and ii) 0.1 to 10% by weight nitro compounds corresponding to formula I

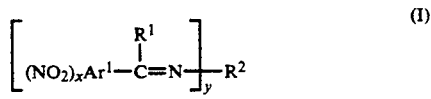

in which $Ar^1$ is a di-, tri- or tetrafunctional aromatic $C_{6-14}$ radical, $R^1$ is a hydrogen atom, a $C_{1-22}$ alkyl radical, a $C_{7-22}$ alkylaryl radical or a $C_{6-14}$ aryl radical, $R^2$ is a di-, tri- or tetrafunctional aliphatic, cycloaliphatic, aromatic or aliphatic-aromatic radical, containing 3 to 100 carbon atoms, which may be arranged in rings' wherein, optionally, two or more aromatic rings may be attached by a chemical bond, an alkylidene radical, an oxygen atom, a sulfur atom, a disulfide bridge, a carbonyl group, a sulfone group or a 5- to 6-membered heterocycle, or if y is the number 2, $R^2$ represents a single bond, x is the number 1, 2 or 3, and y is the number 2, 3 or 4; and B) 0 to 79.9% by weight mineral fillers and reinforcing materials.

2. Moldings of the mixtures claimed in claim 6.

3. Mixtures according to claim 1, wherein said mixtures are produced by mixing said polyarylene sulfide, said nitro compounds and said mineral fillers and reinforcing materials, if present, with shearing at temperatures above the melting point of the polyarylene sulfide.

4. Mixtures according to claim 3, wherein said mixing is performed in a kneader or extruder.

* * * * *

UNITED STATES PATENT AND TRADEMARK OFFICE
CERTIFICATE OF CORRECTION

PATENT NO. : 5,240,988
DATED : August 31, 1993
INVENTOR(S) : Kohler, et al

It is certified that error appears in the above-indentified patent and that said Letters Patent is hereby corrected as shown below:

Column 4, claim 2, line 42, "claim 6" should be corrected to read

-- claim 1 --.

Signed and Sealed this

Twenty-second Day of March, 1994

Attest:

BRUCE LEHMAN

Attesting Officer     Commissioner of Patents and Trademarks